Patented May 8, 1934

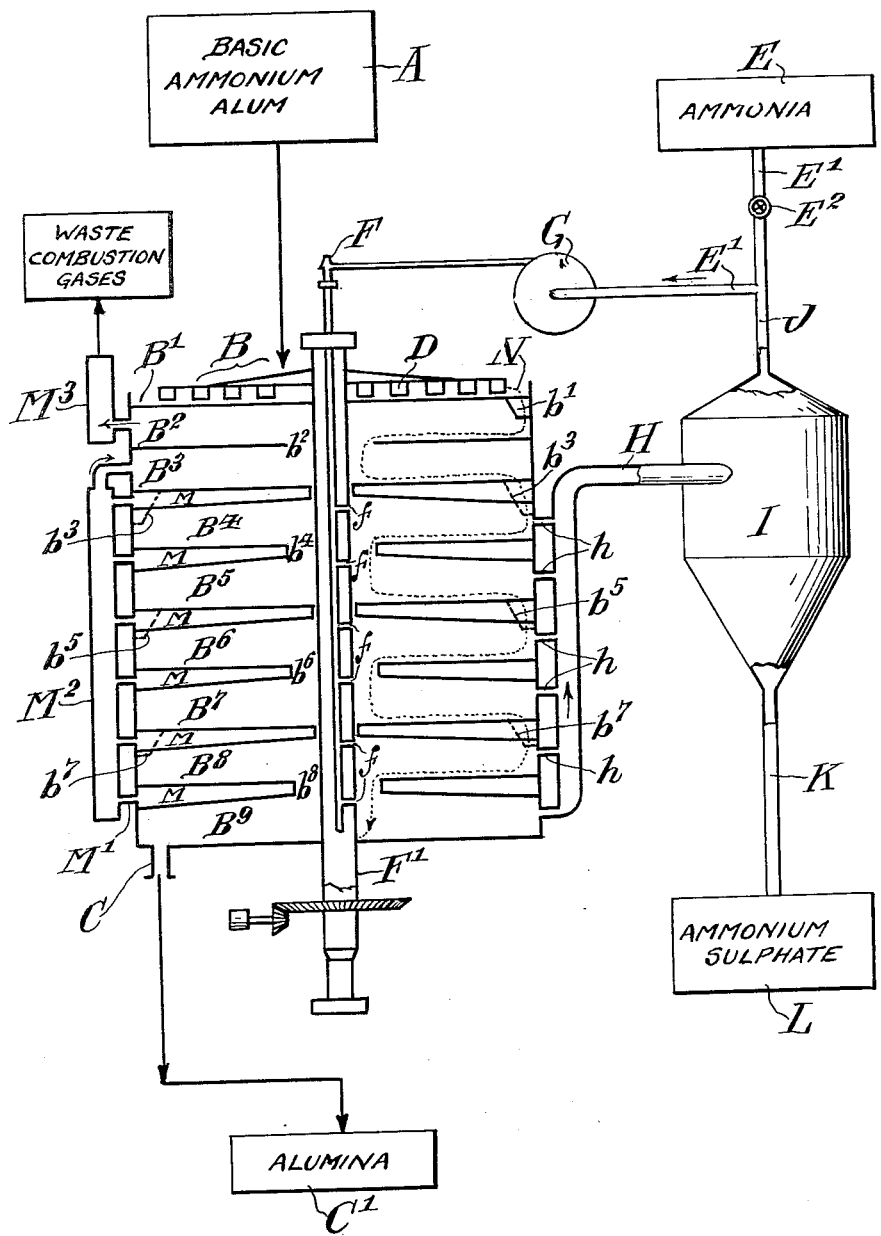

1,957,768

UNITED STATES PATENT OFFICE 1,957,768

MANUFACTURE OF ALUMINA

Arthur Fleischer, Hartford, Conn., assignor to Kalunite Company, Philadelphia, Pa., a corporation of Delaware Application June 30, 1933, Serial No. 678,423

4 Claims. (Cl. 23—142)

My invention relates to the manufacture of a pure alumina from a starting material consisting of a substantially pure basic ammonium alum, for example, one having the formula—

$$NH_42SO_43Al_2O_34SO_39H_2O$$

the object of my invention being to provide an effective and economical process for the production of the alumina and the recovery of other values involved in the process and my invention consists, broadly speaking, in heating basic ammonium alum in a muffle furnace to temperatures at which the ammonium sulphate constituent of the alum will be vaporized and at which a reaction will take place between ammonia and the sulphur trioxide component of the alumina sulphate component of the alum, say between temperatures of 400° and 700° C., passing through said furnace a stream of ammonia gas to effect a reaction between the sulphur trioxide component of the basic aluminum sulphate constituent of the basic alum, driving off from said muffle furnace vaporized ammonium sulphate and unreacted ammonia, condensing the vaporized ammonium sulphate and separating it from the ammonia gas escaping with it from the furnace and re-using said recovered ammonia gas as a part of the stream of ammonia passing through the furnace. By preference, I first subject the basic ammonium alum to a furnace treatment at sufficient temperature to vaporize and drive off any free moisture and then pass the dried product successively through two or more muffles, preferably six, through each of which muffles streams of ammonia gas are passed so that the ammonia comes successively into contact with material containing progressively less undecomposed basic alum so that in the final furnacing treatment a practically pure alumina will be discharged from the last muffle. The same result can, of course, be produced in a single muffle but would require a much longer time of treatment.

It will be understood that the treatment I have described involves the elimination from the basic alum of its water of crystallization and that this water will be condensed together with the ammonium sulphate and, to avoid loss of ammonia by solution in the water, it is advisable that the condensation of the sulphate and water should take place at temperatures not lower than 90° C. at which temperatures no appreciable ammonia will be taken into solution.

I have referred to the heating of the muffles at temperatures between 400° and 700° C. because at these temperatures the reaction described will take place and with progressively greater speed as the temperatures approach the higher limit. It is not advisable to heat the basic alum to temperatures above 700° C. because at higher temperatures the ammonium sulphate is decomposed with formation of nitrogen and sulphur dioxide and, therefore, loss of ammonia.

The preliminary elimination of free water from the basic alum will best be carried on in an open hearth furnace and at temperatures below 400° C.

My invention will perhaps be better understood as described in connection with the drawing which is a diagrammatic elevation of apparatus suitable for use in the practice of my process in a continuous fashion.

A represents a reservoir for basic ammonium alum. B is a multiple hearth furnace, the make-up of which, as shown, consists of a feed hearth $B^1$ located at the top and communicating with an open hearth furnace chamber $B^2$ through a drop hole $b^1$. The open hearth furnace $B^2$ communicates with a second open hearth furnace chamber $B^3$ through an opening as indicated at $b^2$. Below the hearth $B^3$ I have indicated a series of muffle hearth furnaces indicated at $B^4$, $B^5$, $B^6$, $B^7$, $B^8$ and $B^9$ connected in series by drop holes indicated at $b^3$, $b^4$, $b^5$, $b^6$, $b^7$ and $b^8$, the lower muffle hearth having an outlet $b^9$ from which a conduit C leads to a cooling and storage receptacle $C^1$. As indicated, M, M, are the muffles of the muffle hearths which are, of course, fed with fuel in any convenient way and from which the products of combustion pass through conduits $M^1$ connected with a main conduit $M^2$ leading into the open hearth furnace $B^3$ from whch the gases pass into the open hearth $B^2$ and then by exhaust conduit $M^3$ to waste. Means are, of course, provided for stirring the material resting upon the hearth and shifting it in the direction of the outlet openings from each hearth, such, for instance, as rabbles, as indicated at D, in connection with the feed hearth $B^1$ and which rabbles D are attached to the shaft $F^1$. E indicates a reservoir for ammonia connected by a conduit $E^1$ to the muffle hearths, as shown, through a pipe F passing down through the center of the hollow shaft $F^1$ and communicating with each muffle hearth through branch pipes as indicated at $f$. I have indicated at $E^2$ a valve in the conduit $E^1$ and at G a fan located in said conduit. Each of the muffle hearth furnaces is provided with an outlet opening as indicated at $h$, each of said openings communicating with a conduit H which in turn leads to a separating and condensing device or devices indicated in the drawing as a cyclone separator I. From this device I have indicated at J a conduit for gas leading, as shown, to the conduit E¹. From the conical bottom of the separator I, I have indicated a conduit K leading to a storage reservoir indicated at L. I have indicated by the dotted line N the path of the solid material from the feed hearth B¹ to the final muffle hearth B⁹.

In operation, basic ammonium alum is fed from the reservoir A to the feed hearth B¹ and thence through the lower furnace chambers, as indicated by the dotted line N, and substantially pure alumina is drawn from the muffle hearth B⁹ through conduit C into the storage and cooling chamber C¹. The feed hearth B¹, is, as shown, heated only through its floor partition, separating it from the open hearth B² and the open hearth furnaces B² and B³ are heated, as indicated, by flue gases escaping from the muffles. The temperature maintained in the open hearth chamber B³ should be approximately 300° C. and approximately 150° C. for the furnace chamber B², which temperatures will insure prompt drying of the basic alum. The dry basic alum then passes progressively through the muffle hearth furnaces, the temperature of which is so regulated by the combustion of gases in the muffles M as not to exceed a temperature at which the ammonium sulphate will be decomposed and sufficiently high to insure a reaction between the ammonia and the sulphur trioxide constituent of the aluminum sulphate component of the basic alum and sufficiently high to insure the progressive vaporization of the ammonium sulphate and its final complete elimination in the final muffle hearth furnace. This temperature in the upper muffle hearth furnaces should not be permitted to exceed 700° C. but in the extreme lower furnace or furnaces a higher temperature would not be detrimental as the ammonium sulphate would be practically eliminated in the upper muffle hearths. Ammonia is fed to the muffle hearth furnaces from the reservoir E through the conduits E¹, F and f and the gaseous and vaporous products of each muffle hearth passes from the hearths through the conduits h and main conduit H to the condenser and separator I, in which the temperature of these products should be reduced to approximately 90° C. so as to effect the condensation of the water vapor and ammonium sulphate without taking into solution ammonia and the ammonia escapes from the condenser and separator through conduit J which communicates with the conduit E¹, the separated materials, ammonium sulphate and water, are drawn from the separator condenser, as indicated at K.

Having now described my invention, what I claim as new and desire to secure by Letters Patent, is:

1. The method of manufacturing alumina from basic ammonium alum as a starting material which consists in heating the basic alum in a muffle furnace to temperatures between 400° C. and 700° C., passing ammonia in gaseous form through the muffle furnace to react with the sulphur trioxide component of the basic aluminum sulphate constituent of the basic alum with formation of alumina and ammonium sulphate and drawing off from the muffle furnace vaporized ammonium sulphate together with unreacted ammonia and water vapor and drawing from the furnace residual alumina.

2. The method of claim 1, in which the gases and vapors drawn from the muffle furnace are cooled to temperatures which will effect the condensation of the water and sulphate of ammonia vapors.

3. The method of claim 1, in which the gases and vapors drawn from the muffle furnace are cooled to a temperature not substantially below 90° C to effect the condensation of the sulphate of ammonia and water vapor without taking into solution the ammonia.

4. The method of claim 1, in which the basic alum is heated to temperatures which will drive off therefrom free water before being subjected to treatment in the muffle furnace.

ARTHUR FLEISCHER.